United States Patent [19]

McDaniel

[11] 4,272,818
[45] Jun. 9, 1981

[54] POSITION FEEDBACK CONTROL SYSTEM FOR A NUMERICALLY CONTROLLED MACHINE TOOL

[75] Inventor: George H. McDaniel, Northville, Mich.

[73] Assignee: The Bendix Corporation, Southfield, Mich.

[21] Appl. No.: 59,015

[22] Filed: Jul. 19, 1979

[51] Int. Cl.³ ............................ G05B 1/03; G05B 19/19
[52] U.S. Cl. .................................... 364/118; 318/603; 318/608; 364/474; 235/92 MP
[58] Field of Search ............... 364/118, 474; 318/600, 318/601, 603, 604, 605, 608, 660, 661, 562, 569, 570, 574; 235/92 MP, 92 CC, 92 CP

[56] References Cited
U.S. PATENT DOCUMENTS

| | | | |
|---|---|---|---|
| 3,683,345 | 8/1972 | Faulkes et al. | 318/608 X |
| 3,728,607 | 4/1973 | Isak | 318/608 |
| 4,001,558 | 1/1977 | Kelling | 318/608 X |
| 4,023,085 | 5/1977 | Bishop et al. | 318/608 |
| 4,095,158 | 6/1978 | Matsumoto | 318/608 X |
| 4,131,838 | 12/1978 | Etoh et al. | 318/608 X |

Primary Examiner—Joseph F. Ruggiero
Attorney, Agent, or Firm—Markell Seitzman; Russel C. Wells

[57] ABSTRACT

A feedback position control system and method of extracting feedback phase or position information therefrom. A resolver or similar device such as an inductosyn is connected to each movable member of a machine tool such that the phase of the resolver output signal is indicative of the displacement of each movable member about its respective axis. The stator windings of the resolver are excited with reference and quadrature signals to generate a periodically varying output signal. The zero crossings of the output signal are monitored and the digital count in a reference counter ($C_A$ and $C_B$) corresponding to the times of zero crossing are stored. The scaled sum of the counts $C_A$ and $C_B$ is determinative of the phase of the output signal relative to the reference signal.

15 Claims, 5 Drawing Figures

POSITION FEEDBACK CONTROL SYSTEM FOR A NUMERICALLY CONTROLLED MACHINE TOOL

BACKGROUND OF THE INVENTION

Field of the Invention

This invention relates to feedback position control systems for numerically controlled machine tools. More particularly, to a feedback control systems having a transducer operatively attached to a movable member of the machine tool wherein the feedback transducer produces a variable phase signal correlatable to the position of the movable member.

BACKGROUND AND SUMMARY OF THE INVENTION

Machine tools such as milling and boring machines, lathes, drafting machines, plotters and the like can be accurately controlled by numerical control systems utilizing closed loop feedback technology. The numerical control systems typically issue commands to the movable member of the machine tool in accordance with input data derived from a tape reader or input data which may be manually input via a control panel, measure the actual position of the movable member and continually revise and update the command signal to the movable member in a closed loop fashion. In accordance with the present invention, the displacement of any number of movable members of a machine tool is controlled in a closed loop position mode by measuring the phase of the feedback signal. The feedback position control system includes a computer processor having a command generator for generating a position command indicative of the desired position of the movable member and a feedback transducer such as a resolver for generating a cyclically recurring feedback phase signal indicative of the actual displacement of the movable member relative to the cycle of resolver rotation.

A composite feedback signal indicative of the total displacement of each particular movable member is generated by accumulating the total number of resolver revolutions or completed phase signal cycles in combination with the phase of the present feedback signal. The command signal and feedback signal are compared to generate an error signal which drives the machine tool to its desired position. This system further includes a reference signal generator which produces a periodically repeating reference pulse of a predetermined frequency and a counter means responsive to each reference pulse for generating a real time count representative of the time interval between successive referenced pulses. A sinusoidally varying reference signal and sinusoidally varying quadrature signal having a determinable phase relationship to the reference pulses are applied to the stator windings of a particular resolver to generate a sinusoidally varying feedback signal. The phase of the feedback signal relative to the sinusoidal reference signal is obtained by detecting the zero crossings of the feedback signal (output of the resolver) or of a generated square wave. Processor interrupts are generated upon the occurrence of each zero crossing; the reference counter is sampled at two successive zero crossings ($C_A$ and $C_B$) and the contents of the reference counter corresponding to counts $C_A$ and $C_B$ are stored. By adding counts $C_A$ to $C_B$ and dividing by 2, the position of the center of the feedback square wave is positively determined. This information is indicative of the position of the moving member relative to a particular cycle of the phase signal. By choosing the period of the reference counter to be twice that of the period of the reference signal or quadrature signal, the phase of the feedback signal can be uniquely determined at a rate of once per each reference counter cycle.

In addition, by specifying the maximum count of the referenced counter to correspond to 2000 counts, the phase of the feedback signal is computed on a basis of 0 to 999 which corresponds to a resolver rotation of 0/1,000th to 999–1,000th of a revolution. The present invention can be implemented using a number of discrete components or may be implemented within a multi-purpose digital processor such as a micro-processor or mini-computer. While it is not a necessary requirement of the invention, it will be shown that the present invention permits the multi-plexing of a plurality of feedback signals to control a numerically controlled machine tool having a plurality of movable axes.

An advantage of the present invention is that phase shift measurements are not susceptible to low frequency drift. This drift may occur because of variations in the null of the zero crossing detector. In addition, by sampling the feedback signals at points of zero crossing, the present invention displays an excellent rejection of power supply frequencies.

It is an object of the present invention to measure the phase of a feedback signal in a simple and straight forward method. It is a further object of the present invention to provide a feedback position control system which displays a high rejection of low frequency drift. These and many other objects and advantages of the present invention will be clear from the following detailed description of the drawings.

DETAILED DESCRIPTION OF THE DRAWINGS

Figure 1:
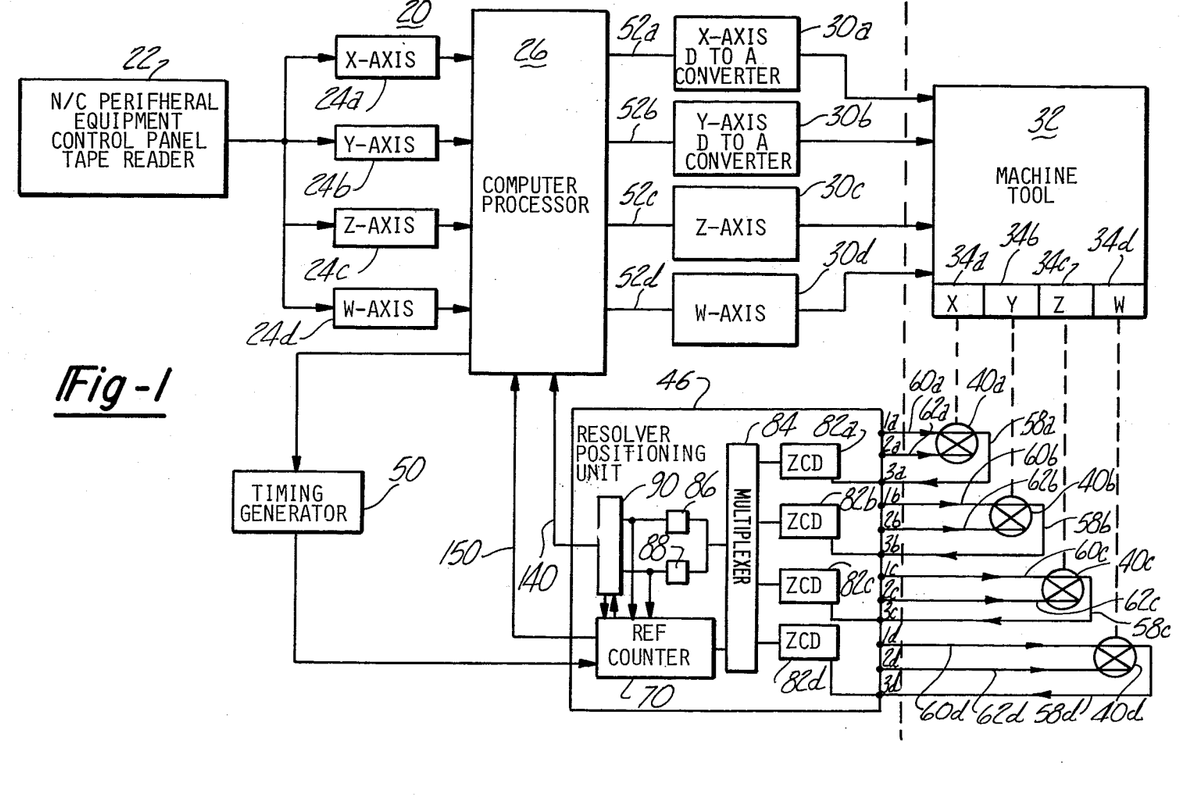
FIG. 1 is a block diagram of the position feedback control system.

Reference is made to FIG. 1 which illustrates a numerical control system 20 for positioning the various movable members 34a–34d of the machine tool 32. The members 34a–34d move along the four controlled axis of the particular numerical controlled machine tool 32 which are identified as X, Y, Z, and w. More particularly, there is illustrated a closed loop position control feedback system 20 which includes some numerical control peripheral equipment 22 such as a control panel or tape reader that is operatively connected to a plurality of axis position command storage units 24a–24d. These position command storage units may be of the type as taught by McDaniel in U.S. Pat. No. 3,701,888, which issued Oct. 31, 1972, and which includes 32 bit command storage registers and means for entering offset position commands. The output of the position command storage units 24a–24d, i.e., the position command signals are input into the computer processor 26. The computer processor 26 is of the known type having a multi-plexer capability for sequentially scanning each of the four position command inputs from the storage units 24a-24d; for combining this information with the multiplexed feedback information generated on lines 140 and 150 and for sequentially generating the desired position error command signals on lines 52a-52d. In addition, the computer processor 20 should be of the variety having interrupt capability. The position error commands are input from the computer processor 26 to the appropriate axis of the machine tool 32 through a plurality of digital to analog converters 30a-30d. It should be appreciated that the actual position error command signal may comprise a time varying component as well as a constant position offset to compensate for the finite dimensions of the cutting elements of the machine tool 32.

Position information for the X, Y, Z, w axes are obtained from a plurality of feedback transducers 40a-40d, respectively. These feedback transducers are operatively coupled to each of the movable members 34a-34d and provide a substantially sinusoidal output signal which varies in phase according to the mechanical position of the movable member 34a-34d or tool slide. Feedback transducers which will satisfy the requirements of the present system include resolvers or Inductosyns which are well known in the art. The feedback transducer output signals constitute variable phase position feedback signals which are generated on lines 58a-58d. Substantially sinusoidal input signals are applied to each resolver from the resolver positioning unit 46 through lines 60a-60d and 62a-62d, respectively. More particularly, the signals input on lines 60a-60d represent a periodically varying reference wave while the input signals on lines 62a-62d represent a quadrature signal which is phase shifted 90° from the periodic reference signal. The variable phase position feedback signals are multi-plexed and decoded within the resolver positioning unit 46 (see FIG. 2). The decoding essentially derives a digital signal proportional to the phase of the resolver output signal which in turn is determinative of the displacement of movable members 34a-34d along their respective axis X, Y, Z, and w. These digital signals are input into the computer processor 26 therein closing the position control feedback loop. The computer processor 26 and resolver positioning unit 46 operate under the control of the timing generator 50 which may be a separate counter interrogated by the computer processor 26.

Figure 2:
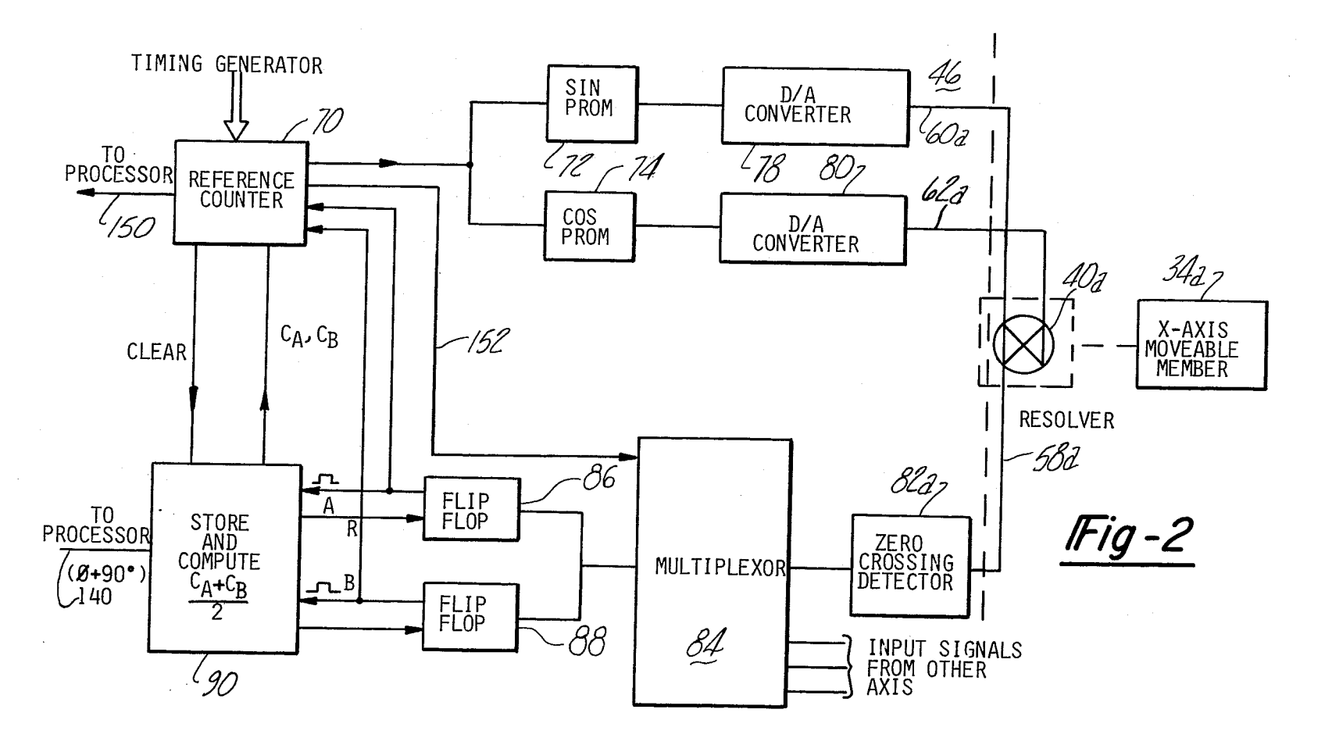
FIG. 2 is a block diagram illustrating one of the resolver positioning units of the present invention.

Reference is now made to FIG. 2, which illustrates a detailed block diagram of the resolver positioning unit 46. The functions of the resolver positioning unit 46 are (1) to excite each transducer, i.e., resolver 40a-40d with a reference signal, and (2) to extract the difference in phase shift between the resolver output signal and the reference or quadrature signals, respectively. A reference counter 70 provides an accurate eight MHz clocking pulse and further provides an accurate real time base for the feedback position measurements. The reference counter 70 may be of the type that cyclically counts from zero to 1999 and provides a digital word indicative of the current count. In the preferred embodiment the 2,000 counts correspond to a period of 250 micro seconds or a fundamental frequency of excitation of four KHz. The reference counter 70 may also provide a lower frequency counting signal (see line 152) which may be used to control the multi-plexer 84. The output of the reference counter 70 is applied to a sine prom 72 (programmable read only memory) and to a cosine prom 76. Both the sine and cosine prom (72 and 76) are addressed in accordance with magnitude of the reference counter output. The output of the sine prom 72 is a sine wave having a fundamental frequency twice that of the fundamental frequency of the reference counter 70. Similarly, the output of the cosine prom 74 is another sinusoidal reference wave having the identical magnitude as the output of prom 72 but phase shifted 90° therein generating the quadrature signal. The outputs of the sine and cosine prom (72 and 74) are input into respective digital to analog converters 78 and 80. The output of each convertor is applied to the appropriate stator winding of resolver 40a through wires 60a and 60b (only the connections to resolver 40a are shown).

Figure 3:
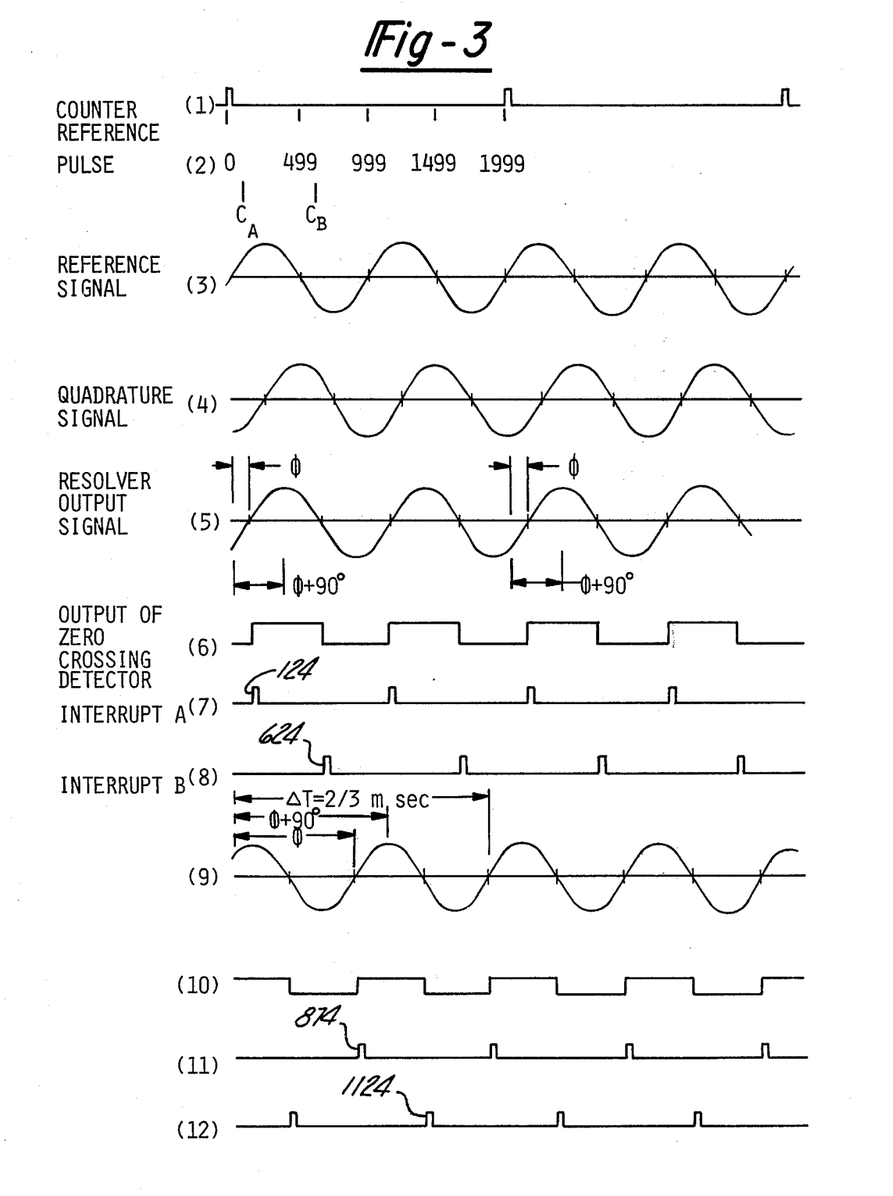
FIG. 3 illustrates some of the basic wave forms generated by the feedback control system.

Reference is briefly made to FIG. 3, lines 1-4 which illustrates the periodic reference pulses from counter 70, (line 1), the accumulated count of the reference counter 70 (0-1999) (line 2) and the sinusoidal and quadrature reference signals (the prom outputs) as illustrated on lines 3 and 4. As previously noted, the rotors of each of the resolvers 40a-40d are mechanically linked to their respective movable members 34a-34d such that the motion of each member produces a corresponding movement of its associated resolver 40a-40d. It is fundamental that by exciting the stator coils of a resolver with a reference and a quadrature signal, a sinusoidal output wave form will be induced in the rotor winding having the same frequency as the reference or quadrature excitation signals but displaced therefrom in phase in proportion to the rotation of the rotor. One typical resolver output signal is shown on line 5 of FIG. 3. Returning to FIG. 2; the output of resolver 40a is input into a zero crossing detector 82a. The output of zero crossing detector 82a is a series of square wave pulses and is illustrated in FIG. 3 line 6. The output of the zero crossing detector 82 is input into multiplexer 84. The output of multiplexer 84 is input into flip-flops 86 and 88. The flip-flop 86 is configured to generate an interrupt request pulse upon the negative-to-positive transition of each of the output square wave transmitted through multiplexer 84. Similarly, flip-flop 88 is configured to generate an interrupt request pulse in correspondence with the positive-to-negative going transition or trailing edge of each of the square wave output pulses. The output of flip-flop 86, which is designated interrupt A, is input into reference counter 70 and into decoder unit 90. Interrupt A will cause the present count $C_A$ in the reference counter to be transferred to and stored in unit 90. The output of flip-flop 88, designated interrupt B, is similarly input into unit 90 and to reference counter 70. The occurrence of interrupt B will cause the present count $C_B$ of reference counter 70 to similarly be transferred to and stored in unit 90. After receipt of the count $C_B$ corresponding to the time of interrupt B, unit 90 will add the count which existed at interrupt A ($C_A$) to the count that existed at interrupt B ($C_B$) and divide by a factor such as 2. This number is output to the computer processor 26 on line 140 and is representative of the phase which exists between the positive going zero crossing of the reference signal and the time of occurrence of the maximum value or center of the resolver output signal. Alternatively, this number can represent the phase shift which exists between the reference signal positive going zero crossing and the corresponding positive zero crossing of the resolver output signal or any other suitable point in the reference signal or quadrature signal.

Reference is made to FIG. 3, lines 5–8, which illustrate one example of an anticipated resolver output signal. More particularly, there is shown a resolver output signal which lags behind the input reference signal by 45°. Line 6 illustrates the output of the zero crossing detector 82a which is a square wave corresponding to the phase of the resolver output signal. Line 7 illustrates the periodic occurrence of interrupt A. It can be seen that the first time of occurrence of interrupt A corresponds to a count of 124 in reference counter 70. In addition, it can be seen that the count which will exist in reference counter 70 at the time of occurrence of interrupt B, is 624. Adding count $C_A$ to count $C_B$ and dividing by 2 will yield the phase shift which exists between the reference signal at the time of achieving the maximum value of the resolver output signal. It can be seen from FIG. 3 that a reference count of 999 represent a phase shift to 360° and that a phase shift of 90° is represented by a count of approximately 250. By subtracting 249 from the count of 374 yields the desired phase shift $\phi$, which represents a 45° phase shift and corresponds to the count of 124.

Referring now to lines 9–12 of FIG. 3 there is shown a second example of a resolver output signal. In this example, the resolver output signal leads the reference signal by 45°. It can be seen that the present method of phase shift computation is applicable to leading phase wave forms.

The output of unit 90 for this example will be a count of 1124 which is representative of the phase at the point A. Subtracting a count of 250 can be used to reference the phase calculations to the negative to positive zero crossing of the reference signal. It can be seen that the reduced count (1124−250) of 874 indicates a phase corresponding to the 45° phase lead.

Figure 4:
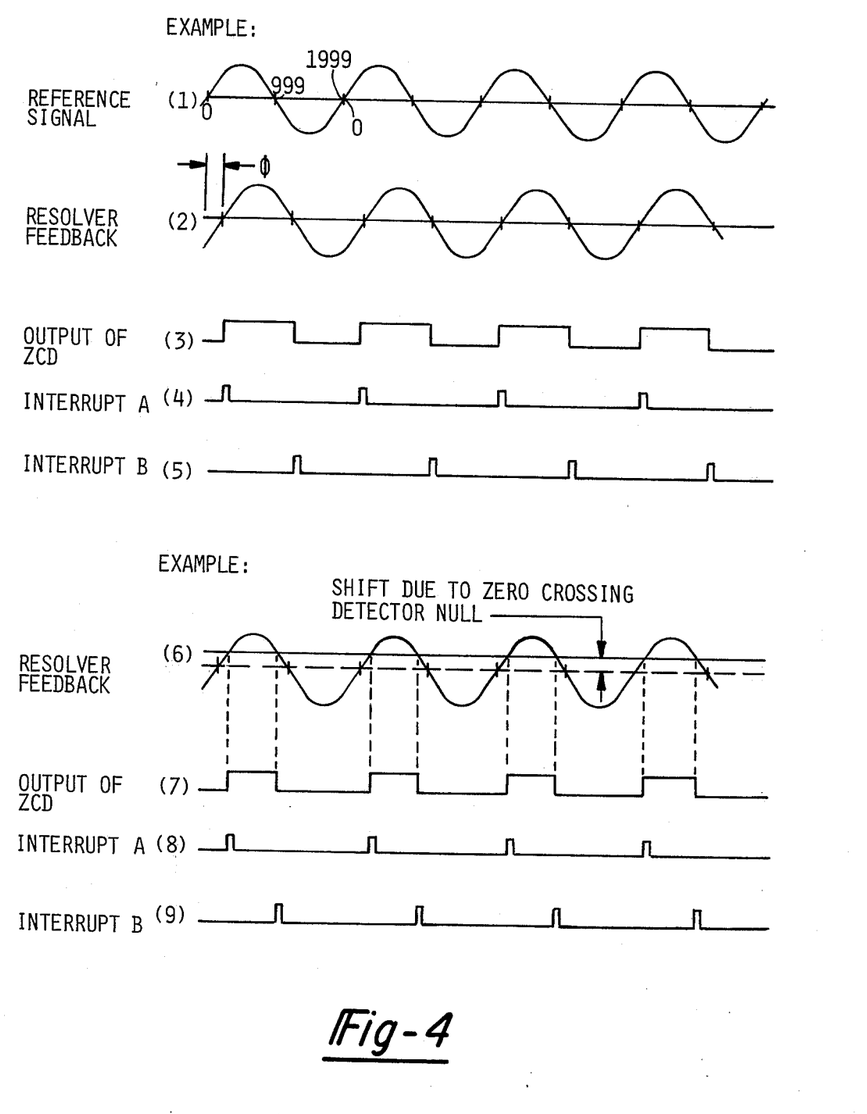
FIG. 4 illustrates the effect of the null shift of the zero crossing detector on system performance.

As previously mentioned, one advantage of the present invention is that the method of phase shift detection and calculation is not susceptible to errors resulting from a shift in the zero level of the output of the zero crossing detectors 82. This advantage can be seen from FIG. 4. Reference is made to lines 1–5 of FIG. 4 which are the wave forms as shown in FIG. 3 (lines 1,5,6,7,8) but reproduced herein for convenience. Reference is made to line 6 of FIG. 4 which shows a sinusoidal resolver output signal having a superimposed zero magnitude line which has been shifted upward to reflect an unknown shift in the zero crossing detector null. This shift in the zero crossing detector null will not effect the computed phase of the resolver output signal. It can be seen that the magnitude of the count corresponding to interrupt A and the count corresponding to interrupt B differ from the respective counts which exist for the case of no shift in the zero crossing detector null. However, since the present invention seeks to determine the phase shift between the center of the resolver feedback signal or in essence, the center of the output of the zero crossing detector, a shift in the zero crossing detector null will have no effect on the determined phase of the resolver output signal.

Returning briefly to FIGS. 1 and 2, the multiplexer 84 may be of the known variety as disclosed by McDaniel in U.S. Pat. No. 3,666,930, which issued May 30, 1972, which is expressly incorporated by reference.

In addition it should be appreciated that the multiplexer 84 is not a requirement of the invention, however, the incorporation of the multiplexer 84 into the system does permit efficiencies in hardware and software utilization.

Figure 5:
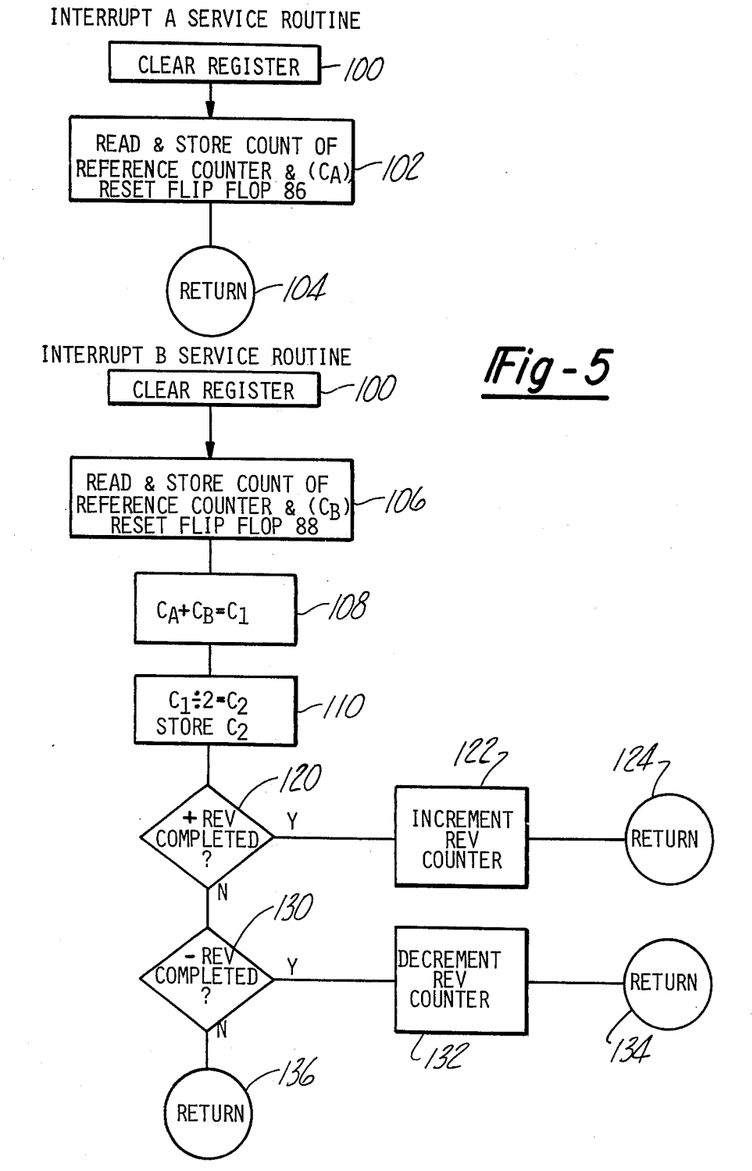
FIG. 5 illustrates a flow diagram for use in implementing the phase measurements as defined by the present invention.

Reference is made to FIG. 5 which illustrates flow diagrams associated with the interrupt service routines which may be used to implement the computations performed in unit 90. In response to a clearing signal generated by counter 70 all storage registers within unit 90 are cleared as shown in block 100.

When interrupt A occurs, the count within reference counter 70 is read and stored as shown in block 102 and control of the system is returned (block 104) to the operating program. When interrupt B occurs, the reference counter 70 is read (block 106) to determine the count $C_B$. Counts $C_A$ and $C_B$ are added together (block 108) and the resulting sum may be divided by 2 and stored (block 110). These calculations yield a signal which is determinative of the output phase between the resolver output signal and the input reference signal.

As any movable member 34 is caused to move along its axis of travel its respective resolver will generate a recurring sinusoidal output periodically varying in phase from 0° to 360° relative to an appropriate reference point in a reference signal. In order to extend the positive indicating range of the system 20 beyond one cycle of feedback information to indicate position along the entire range of travel of each movable member 34a–d, the computer processor 26 communicates with the reference counter 70 through line 150 and maintains a revolution counter, one for each movable member 34 to indicate completed revolutions of the appropriate resolver 40a–d. A functional block diagram of this process which forms a part of the interrupt B service routine is shown in FIG. 5. The processor 26 detects a completed revolution when the count within the reference counter 70 representative of the feedback phase (output of block 110) changes from 999 to 0 or indicating a complete revolution in the positive direction (block 120). In addition the processor 26 indicates a complete revolution in the negative direction (block 130) when the feedback phase number changes from 0 to 999. The revolution counter is incremented or decremented as shown in blocks 122 and 123 respectively and control is returned to the computer processor (blocks 124, 126, 136).

Changes and modifications in the specifically described embodiments of the present invention can be carried out without departing from the scope of the invention, which is intended to be limited only by the scope of the appended claims.

Having thus described the invention, what is claimed is:

1. A feedback position control system controlling the displacement of at least one movable member of a numerical control apparatus and further having transducer means, responsive to excitation signals, operatively connected to each movable member for generating an output signal having a cyclically recurring phase relationship with respect to the excitation signals that is correlatable with the displacement of the at least one movable member, the feedback position control system comprising:

command means for generating a command signal indicative of the desired position of the at least one movable member;

feedback means for generating a feedback signal indicative of the motion of said at least one member comprising:

phase detecting means for determining the phase of said output signal relative to a determinable reference irrespective of the d.c. bias level of the output signal;

conversion means for converting said determined phase into a first signal indicative of the motion of said at least one movable member during a particular cycle of said output signal; and wherein said system further includes comparator means for comparing said command signal and said feedback signal and for generating an error signal for driving said at least one member to the desired position.

2. The system as recited in claim 1 wherein said feedback means further includes:
   direction of motion sensing means for generating an accumulative signal indicative of the number of completed cycles of said first signal;
   combining means for combining said first signal and said accumulative signal to generate said feedback position signal.

3. The system as recited in claim 2 further including signal shaping means for conditioning and shaping said output signal prior to input to said phase detecting means.

4. The system as recited in claim 3 wherein said signal shaping means is a zero crossing detector responsive to the zero voltage crossings of said output signal.

5. A feedback position control system controlling the displacement of at least one movable member of a numerical control apparatus and further having transducer means, responsive to excitation signals, operatively connected to each movable member for generating an output signal having a cyclically recurring phase relationship with respect to the excitation signals that is correlatable with the displacement of the at least one movable member, the feedback position control system comprising:

command means for generating a command signal indicative of the desired position of the at least one movable member;

feedback means for generating a feedback signal indicative of the motion of said at least one member comprising:

phase detecting means for determining the phase of said output signal relative to a determinable reference irrespective of the d.c. bias level of the output signal including:

reference counter means for generating a recurring real time count having a predetermined period;

phase means responsive to the output signal of said transducer means for determining the phase relationship between said output signal relative to the transducer excitation signals;

first zero crossing means responsive to zero crossings of said output signal in a determinable direction for generating an indicator signal indicative of the first of said zero crossings in said determinable direction occurring during a predetermined interval of the excitation signals;

second zero crossing means responsive to said output signal for generating a second signal upon the occurrence of the next zero crossing of said output signal;

first means responsive to said indicator signal for storing a first count having the value of the count within said reference counter means at the occurrence of said indicator signal;

second means responsive to said second signal for generating a summed count by adding to said stored first count the value of the count within said reference counter means at the occurrence of said second signal; and dividing means for dividing said summed count by a determinable factor to generate a number indicative of the phase relationship between a predetermined point with the excitation signals and the first maximum of the output signal occurring after said indicator signal;

conversion means for converting said determined phase during a particular cycle of said output signal into a first signal indicative of the motion of said at least one movable member; and wherein said system further includes:

comparator means for comparing said command signal and said feedback signal and for generating an error signal for driving said at least one member to the desired position.

6. The system as recited in claim 5 wherein said reference counter means produces a series of reference pulses having a predetermined relationship relative to the zero crossings of the excitation signals.

7. The system as recited in claim 6 wherein said predetermined relationship of said reference counter means includes maintaining the period of said reference counter means equal to twice the period of the transducer excitation signals.

8. The system as recited in claim 7 wherein said comparator means includes means for normalizing said phase relative to the time of the first maximum value of said reference signal occurring after said first signal to generate said position feedback signal.

9. A method of determining the displacement of a movable member of a numerically controlled apparatus having a transducer linked to and movable with the number and where the phase of the output signal of the transducer is correlatable to the position of the member, the method comprising:

a. exciting the transducer with a periodic first reference signal of known frequency, and exciting the transducer with a second reference signal shifted in phase relative to the first reference signal to generate a transducer output signal;

b. starting a reference counter having a counting period twice that of the period of either reference signal;

c. monitoring the first positive zero crossing of said transducer output signal in a determinable direction after or in concurrence with the starting of said reference counter;

d. storing the value of the count within said reference counter corresponding to the first positive zero crossing in step c;

e. storing the value of the count within said reference counter corresponding to the next zero crossing of the resolver output signal; and f. determining the phase of said output signal by adding the counts stored in step d and step e and dividing by 2.

10. The method as recited in claim 9 including the additional step of adding to the parameter defined in step f a count corresponding to a determinable amount of phase shift to translate the phase shift of said output signal relative to a determinable point within the waveform of the transducer excitation reference signals.

11. A feedback position control system for controlling the displacement of at least one movable member of a numerical control apparatus and further having transducer means, responsive to excitation signals, operatively connected to each movable member for generating an output signal having a cyclically recurring phase relationship with respect to the excitations signals that is correlatable with the displacement of the at least one movable member, the feedback position control system comprising:

command means for generating a command signal indicative of the desired position of the at least one movable member;

feedback means for generating a feedback signal indicative of the motion of said at least one member comprising:

phase detecting means for determining the phase of said output signal relative to a determinable reference irrespective of the d.c. bias level of the output signal, including:

reference counter means for generating a recurring real time signal having a determinable period; wherein said recurring real time signal is a recurring digital count;

reference means responsive to said real time signal for generating a periodically repeating first reference signal to excite said transducer means;

quadrature means responsive to said real time signal for generating a periodically repeating second reference signal, to further excite said transducer means, that is shifted in phase from and has the same frequency as said first reference signal;

first means responsive to said output signal for sampling the count within said reference counter means and for storing a first number corresponding to said count upon the occurrence of a first zero crossing of said output signal in a determinable direction;

second means responsive to the next zero crossing of said output signal for sampling the count within said reference counter means and for storing a second number corresponding to the count within said reference means at said next zero crossing;

third means for generating a third number that is equal to the sum of said first and said second number and for dividing said third number by a factor;

conversion means for converting said determined phase into a first signal indicative of the motion of said at least one movable member during a particular cycle of said output signal; and wherein said system further includes:

comparator means for comparing said command signal and said feedback signal and for generating an error signal for driving said at least one member to the desired position.

12. The system as recited in claim 5 wherein said feedback means further includes:

direction of motion sensing means for generating an accumulative signal indicative of the number of completed cycles of said first signal;

combining means for combining said first signal and said accumulative signal to generate said feedback position signal.

13. The system as recited in claim 11 wherein said feedback means further includes:

direction of motion sensing means for generating an accumulative signal indicative of the number of completed cycles of said first signal;

combining means for combining said first signal and said accumulative signal to generate said feedback position signal.

14. The system as recited in claim 13 further including signal shaping means for conditioning and shaping said output signal prior to input to said phase detecting means.

15. The system as recited in claim 14 wherein said signal shaping means is a zero crossing detector responsive to the zero voltage crossings of said output signal.

* * * * *